Figure 1:
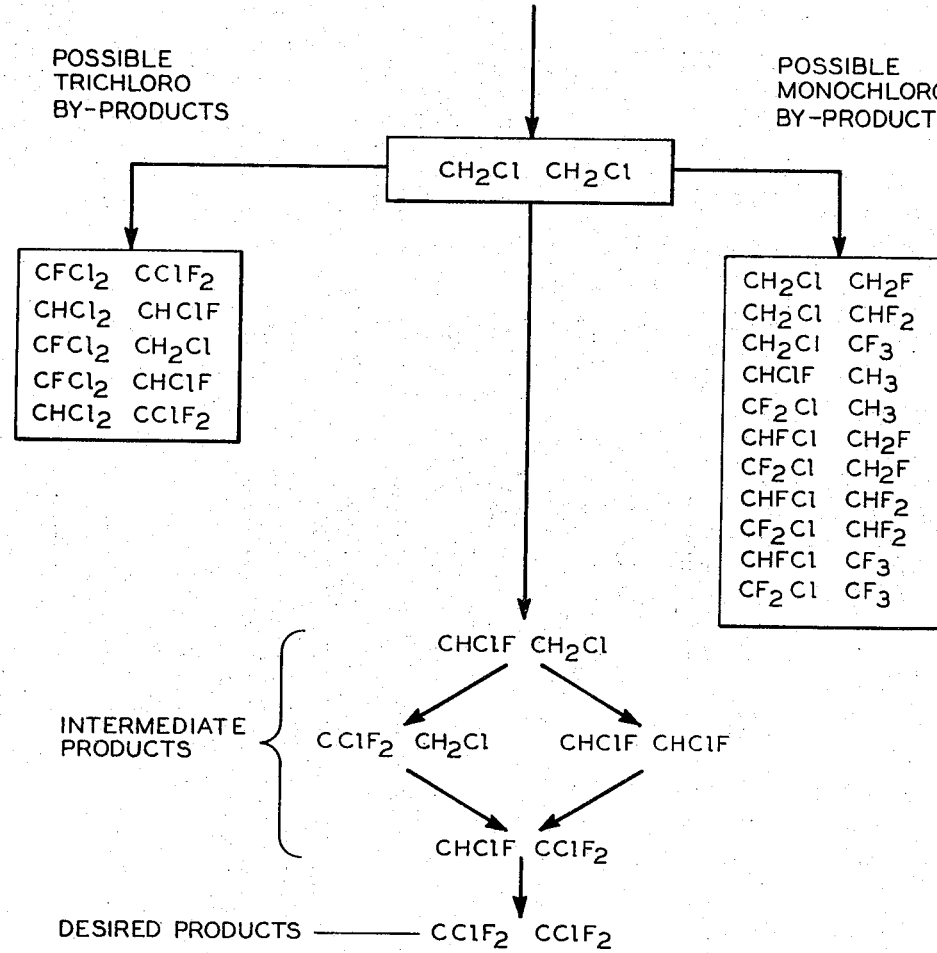

United States Patent

Stewart et al.

[15] 3,645,863
[45] Feb. 29, 1972

[54] ELECTROCHEMICAL FLUORINATION

[72] Inventors: William S. Stewart; John W. Vanderveen, both of Bartlesville, Okla.

[73] Assignee: Phillips Petroleum Company

[22] Filed: Oct. 20, 1969

[21] Appl. No.: 867,732

[52] U.S. Cl. ..................................................204/59
[51] Int. Cl. .....................................................B01k 3/00
[58] Field of Search .........................................204/59

[56] References Cited

UNITED STATES PATENTS 3,511,760   5/1970   Fox et al. ..................................204/59

*Primary Examiner*—John H. Mack
*Assistant Examiner*—Neil A. Kaplan
*Attorney*—Young and Quigg

[57] ABSTRACT

In an electrochemical fluorination process, the residence time or contact time of the feedstock with the fluorinating species within the pores of a porous anode is regulated so as to reduce or eliminate the formation of undesired by-products and increase the production of the desired final product.

9 Claims, 3 Drawing Figures

INVENTORS
W.S. STEWART
J.W. VANDERVEEN
BY Young and Quigg
ATTORNEYS

ELECTROCHEMICAL FLUORINATION

This invention relates to electrochemical fluorination. In one aspect the invention relates to regula,ing the residence time or contact time of the feedstock with the fluorinating species within the pores of a porous anode.

Electrochemical fluorination processes for preparing or converting a wide variety of feedstocks into desirable fluorinated products are well known in the art. Generally speaking, these processes usually involve immersing an electrode element in an electrolyte and passing an electric current through said electrolyte between said electrode and an oppositely charged element, e.g., either another electrode immersed in said electrolyte or the cell body which can serve as said other element or electrode. In recent years electrochemical fluorination processes have been developed wherein porous anode elements are employed. In one process employing a porous anode element a feedstock to be converted is passed through the porous anode into the main body of the electrolyte.

Recently it has been discovered that the reaction in an electrochemical fluorination process can be carried out within the confines, e.g., within the pores, of the porous anode itself. This type of operation is of particular utility with many feedstocks because it provides or makes possible a process to produce partially fluorinated products which had previously been difficult to obtain. This process also allows operation at high conversions without substantial formation of cleavage products which are generally produced by the older methods when operating at high conversions. The feedstock to be fluorinated can be introduced into the pores of the porous anode at a point near its bottom and the fluorinated mixture removed from said pores at the top of the anode, generally above the electrolyte level. Passage of the feedstock into the bulk of the electrolyte is thus avoided.

In prior art electrochemical fluorination processes, when charging a feedstock having a plurality of possible fluorination sites, there will be obtained a mixture of fluorinated products. The composition of said mixture will depend upon the sites fluorinated and the order in which said sites are fluorinated. The actual product distribution obtained is influenced by such factors as conversion, cell current density, and other operating conditions. We have discovered that the fluorination usually proceeds via a series of reactions which produce various partially or intermediate fluorinated products. These partially fluorinated products can be further fluorinated by still other reactions in the series or chain of reactions until the desired degree of fluorination is obtained, taking into consideration the optimum amount of conversion of the feedstock. It is desirable to avoid overfluorination because if too much fluorine is introduced into the molecule, the yield of desired product will be reduced. It is particularly desirable to avoid or prevent the occurrence of side reactions which are not in the regular chain or series of reactions leading to the desired product.

The present invention provides a solution for the above-described problems. We have now discovered that by carrying out the fluorination reaction under regulated residence time conditions, the production of undesired fluorinated intermediate products and undesired byproducts can be reduced or eliminated, and the production of desired products increased. Thus, broadly speaking, the present invention comprises introducing a fluorinatable feedstock into the pores of a porous anode and therein partially fluorinating same at a residence time which is sufficient for the formation of a desired fluorinated product but which is insufficient for the formation of appreciable amounts of undesired fluorinated intermediate products and undesired byproducts. In one sometimes preferred embodiment of the invention, the feedstock is fluorinated in a first anode at a residence time which is sufficient to produce a desired intermediate fluorinated product, but which is insufficient to produce other undesired fluorinated intermediate products and undesired by-products. Said desired fluorinated intermediate product is then further fluorinated in a second anode to produce a desired final product.

An object of this invention is to provide an improved electrochemical fluorination process. Another object of this invention is to provide an improved electrochemical fluorination process wherein the residence time or contact time during which a fluorinatable feedstock is subjected to fluorinating conditions is regulated. Another object of the invention is to regulate the length of time a fluorinatable feedstock is subjected to fluorinating conditions so as to avoid the production of appreciable amounts of undesired intermediate fluorinated products and/or undesired byproducts. Another object of the invention is to provide an improved electrochemical fluorination process wherein the residence time or contact time during which a fluorinatable feedstock is subjected to fluorinating conditions can be controlled or regulated to avoid the formation of undesired intermediate products and undesired byproducts. Another object of the invention is to provide an improved electrochemical fluorination process wherein the residence time or contact time during which a fluorinatable feedstock is subjected to fluorinating conditions is regulated or controlled so as to produce only a desired intermediate fluorinated product, and then fluorinating said intermediate fluorinated product to a desired final product. Other aspects, objects and advantages of the invention will be apparent to those skilled in the art in view of this disclosure.

Thus, according to the invention, there is provided a process for the electrochemical fluorination of a fluorinatable feedstock to a desired fluorinated product, which process comprises: passing an electric current through a current-conducting, essentially anhydrous, liquid hydrogen fluoride electrolyte contained in an electrolysis cell provided with a cathode and a porous anode; passing said feedstock into the pores of said anode and therein fluorinating a portion of said feedstock to a desired fluorinated product at a residence time which is sufficient for the formation of said desired product but which is insufficient for the formation of appreciable amounts of other fluorinated products and byproducts; passing an effluent stream comprising said desired product and unfluorinated feedstock from within said pores to a separation zone; and in said separation zone, recovering said desired product.

The actual residence time or contact time employed in the practice of the invention will depend upon the particular feedstock being fluorinated, the desired final product, and the desired purity of said final product. Said residence time or contact time and other operating variable such as conversion, current density, cell temperature, etc., are interrelated and the optimum residence time to be employed is determined to some extent by said other operating variables. However, said residence time or contact time is controlling and for any given set of operating conditions there will be a desirable residence time or contact time to which the process can be regulated to result in (1) the production of only a desired final fluorinated product and unconverted feedstock, or (2) the production of a desired intermediate fluorinated product and minimum or essentially no production of undesired other intermediate fluorinated products and unconverted feedstocks. Said intermediate fluorinated product(s) can then be separated from the reaction mixture and fluorinated to a desired final product in a second anode. Thus, the invention is not limited to employing any particular specific residence time or contact time.

A number of advantages are realized or obtained in the practice of the invention. One important advantage is that production of undesired byproducts which reduce the yield of desired products can be avoided or at least minimized. For example, in the production of 1,2-dichlorotetrafluoroethane from 1,2-dichloroethane, the production of monochloro and trichloro fluorinated ethanes can be essentially eliminated. Another outstanding advantage is that, if desired, the residence or contact time can be regulated so as to (1) produce only a desired final product, or (2) produce only a desired intermediate product which can then be fluorinated to a desired final product.

The invention is applicable to any electrochemical fluorination process employing an electrolyte comprising essentially anhydrous hydrogen fluoride. The invention is particularly applicable to electrochemical fluorination processes in which porous anodes are employed. In one presently preferred process, a current-conducting, essentially anhydrous, liquid hydrogen fluoride electrolyte is electrolyzed in an electrolysis cell provided with a cathode and a porous anode (preferably porous carbon), a fluorinatable feedstock is introduced into the pores of said anode and at least a portion of said feedstock is at least partially fluorinated within the pores of said anode, and fluorinated products are recovered from a cell effluent stream.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting to form plurally fluorinated products, are presently preferred as starting materials. Generally speaking, desirable organic starting materials which can be used are those containing from two to eight, preferably two to six, carbon atoms per molecule. However, reactants which contain less than two or more than six or eight carbon atoms can also be used. Some general types of organic starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds.

One group of presently preferred starting materials are the normally gaseous organic compounds, and particularly the saturated and unsaturated hydrocarbons, containing from two to four carbon atoms per molecule. Normally liquid feedstocks which can be vaporized under cell operating conditions are also preferred starting materials. Some examples of these are ethane, propane, butane, isobutane, ethylene, propylene, butene-2, acetylene, propyne, butyne-1, butadiene, and the like, and mixtures thereof.

One presently more preferred class of starting materials for use in the practice of the invention includes the plurally fluorinatable, partially halogenate; compounds. In said halogen-containing feedstocks the halogen can be any of the halogens, chlorine, bromine, iodine, or fluorine. Preferably, the halogen is one other than fluorine. Partially chlorinated hydrocarbons have been found particularly useful. Examples of said compounds include, among others, the following: mono, di, tri, and tetrachloroethanes; monofluoro, mono, di, and trichloroethanes; difluoro, mono, and dichloroethane; trifluoro, monochloro, and dichloroethane; mono, di, tri, and tetrabromoethanes; mono, di, tri, and tetraiodoethanes; etc. Thus, applicable compounds include: methyl chloride, methyl fluoride, methylene diiodide; chlorofluoromethane; bromochloromethane; 1,2-dichloroethane; 1,1-diiodoethane; 1-bromo-2-fluoroethane; 1,1,2-trichloroethane; 1,1-dichloro-2,2-difluoroethane; 1,2-dichloropropane; 1-bromo-3-iodopropane; 1-chloro-3-fluoropropene; 1,1-dichloro-2,3-difluoropropane; 1,1,1,2-tetrafluoropropane; 1,1-dichlorobutane; 2,3-dibromobutane; 1,1,1-trichloro-3-iodobutane; 1,4-difluorobutene-2; 1, 2, 3-trichlorobutane; and the like, and mixtures thereof.

The hydrogen fluoride electrolyte can contain small amounts of water, such as up to about 5 weight percent. However, it is preferred that said electrolyte be essentially anhydrous, e.g., contain not more than about 0.1 weight per cent water. Commercial anhydrous liquid hydrogen fluoride containing up to about 1 per cent by weight of water can be used. Thus, as used herein and in the claims, unless otherwise specified, the term "essentially anhydrous liquid hydrogen fluoride" includes liquid hydrogen fluoride which can contain water not exceeding up to about 1 per cent by weight. As the electrolysis reaction proceeds, any water contained in the hydrogen fluoride electrolyte is slowly decomposed and said electrolyte concomitantly approaches the anhydrous state. Pure anhydrous liquid hydrogen fluoride is nonconductive. To provide adequate conductivity in the electrolyte, and to reduce the hydrogen fluoride vapor pressure at cell operating conditions, an inorganic additive can be incorporated in the electrolyte. Presently preferred additives for this purpose are the alkali metal fluorides and ammonium fluoride. Said additives can be utilized in any suitable molar ratio of additive to hydrogen fluoride within the range of from 1:4.5 to 1:1, preferably 1:4 to 1:2.

Generally speaking, the fluorination process can be carried out at temperatures within the range of from −80° to 500° C. at which the vapor pressure of the electrolyte is not excessive, e.g., less than 250 mm. Hg. It is preferred to operate at temperatures such that the vapor pressure of the electrolyte is less than about 50 mm. Hg. A presently preferred range of temperature is from about 60° to about 120° C.

Pressures substantially above or below atmospheric can be employed if desired, depending upon the vapor pressure of the electrolyte as discussed above. Generally speaking, the process is conveniently carried out at substantially atmospheric pressure.

Current densities within the range of 30 to 1,000, or more, preferably 50 to 500, milliamps per square centimeter of anode geometric surface can be used. The voltage which is normally employed will vary depending upon the particular cell configuration employed and the current density desired. Under normal operating conditions, however, the cell voltage or potential will be less than that required to evolve or generate free or elemental fluorine. Voltages in the range of 4 to 12 volts are typical. Generally speaking, the maximum normal voltage will not exceed 20 volts per unit cell. The term "anode geometric surface" refers to the outer geometric surface area of the porous element of the anode which is exposed to the electrolyte and does not include the pore surface of said porous element.

Feed rates which can be employed will preferably be within the range of from 0.5 to 10 ml. per minute per square centimeter of anode geometric surface area. Since the anode can have a wide variety of geometrical shapes, which will affect the geometrical surface area, a sometimes more useful way of expressing the feed rate is in terms of anode cross-sectional area (taken perpendicular to the direction of flow). More preferably, the feed rate will be such that the feedstock is passed into the pores of the anode, and into contact with the fluorinating species therein, at a flow rate such that the inlet pressure of said feedstock into said pores is essentially less than the sum of (a) the pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of electrolyte pressure. Under these preferred flow rate conditions, there is established a pressure balance between the feedstock entering the pores of the anode from one direction and electrolyte attempting to enter the pores from another and opposing direction. Essentially all of the feedstock travels within the porous anode via the pores therein until it exits from the anode at a point above the surface of the electrolyte. Broadly speaking, the upper limit on the flow rate will be that which "breakout" of feedstock and/or fluorinated product begins along the immersed portion of the anode. "Breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the feed rates can be within the range of from 3 to 600, preferably 12 to 240, cc. per minute per square centimeter of cross-sectional area (taken perpendicular to the direction of flow). Herein and in the claims, unless otherwise specified, for convenience the volumetric feed rates have been expressed in terms of gaseous volume calculated at standard conditions, even though the feedstock may be introduced into the porous anode in liquid state.

Referring now to the drawings, the invention will be more fully explained with particular reference to the fluorination of ethylene dichloride, e.g., 1,2-dichloroethane. However, the invention is not limited to the fluorination of said 1,2-dichloroethane. Referring to FIG. 1, there is illustrated diagrammatically three series or chains of reactions which are involved in the electrochemical fluorination of 1,2-dichloroethane. These chains or series of reactions are, in effect, competing for the 1,2-dichloroethane feedstock. One of the series or chains of reactions is that shown on the left which results in the production of at least some of the variously fluorinated trichlorinated products. Another chain or series of reactions is that shown on the right which results in the production of at least some of the variously fluorinated monochlorinated products. Production of mono and trichlorinated products may proceed simultaneously. The chain or series of reactions most usually desired is that shown in the center which leads to the ultimate production of 1,2-dichlorotetrafluoroethane. We have discovered that by proper regulation or control of the residence time or contact time of the 1,2-dichloroethane feedstock with the fluorinating species within the pores of the porous anode, the reactions taking place and the extent to which said reactions proceed can be regulated so that substantially all of the feedstock is converted in accordance with the desired reaction series or chain.

For example, referring again to FIG. 1, with uncontrolled residence time, feedstock fluorination will proceed along all three of said series or chains of reactions. This is undesirable when it is desired to produce dichloro fluorinated products, such as 1,2-dichlorofluoroethane or 1,2-dichlorotetrafluoroethane. In such instances, the production of the monochloro and the trichloro products represents a direct loss of potential product because said monochloro and trichloro byproducts will not revert to dichloro materials.

Figure 2:
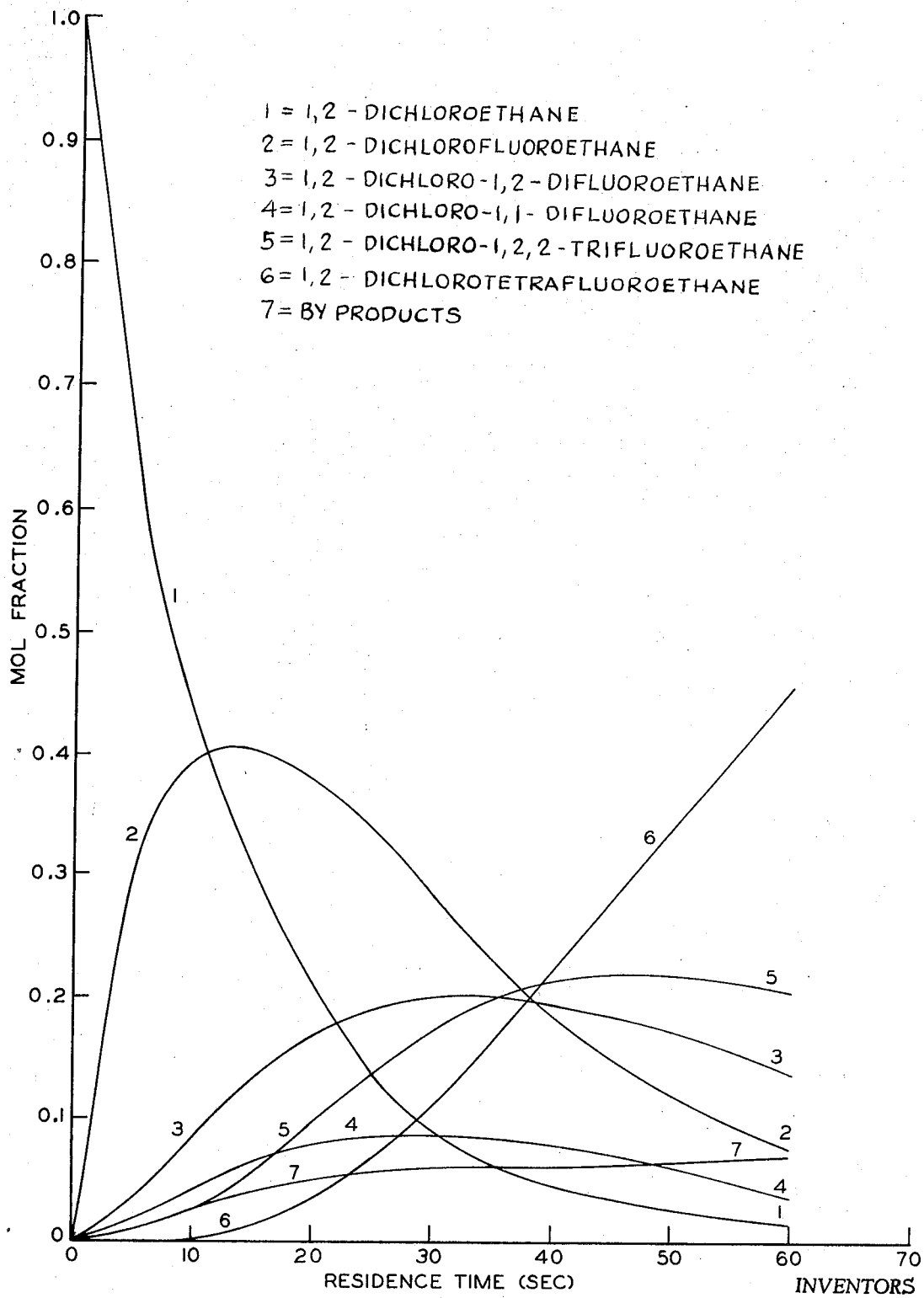

FIG. 2 is a graph-plotting mol fractions of the desired and intermediate reaction products given in FIG. 1 versus residence time. For convenience and clarity, all of the monochloro and all of the trichloro byproducts have been combined and shown in one curve which is labeled "-byproducts." The derivation of this family of curves is discussed further hereinafter. Referring to said FIG. 2, it can be seen that at or below a residence time of about 2.5 seconds the production of said monochloro and trichloro byproducts is essentially eliminated and the only product produced in significant quantities is 1,2-dichlorofluoroethane. At a residence time of about 2.5 seconds the conversion of the ethylene dichloride feedstock is about 17.5 per cent with about 90 per cent of the feedstock being converted to 1,2-dichlorofluoroethane, and substantially all of the remaining 10 per cent being divided among two other useful intermediate products as shown.

Thus, the series or chain of reactions illustrated in the center of FIG. 1 has been caused to predominate. If said 1,2-dichlorofluoroethane is the desired product, the series or chain of reactions can be terminated at this point and the cell effluent stream separated into said 1,2-dichlorofluoroethane product, the dichlorodifluoroethanes, and unreacted ethylene dichloride of which the latter can be recycled to the electrochemical fluorination cell. However, in many instances, a much more desirable product is 1,2-dichlorotetrafluoroethane.

Figure 3:
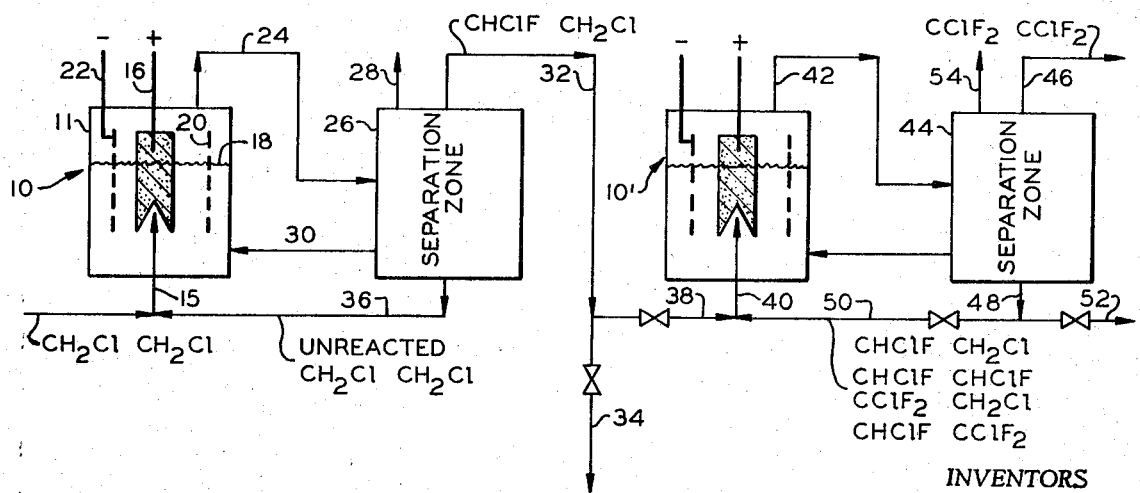

FIG. 3 illustrates diagrammatically two presently preferred embodiments of the invention. One embodiment is directed to the production of said 1,2-dichlorofluoroethane. The other embodiment is directed to the production of said 1,2-dichlorotetrafluoroethane.

In FIG. 3 there is illustrated an electrolytic cell, denoted generally by the reference numeral 10, comprising a cell body 11 having an anode 12 disposed therein. As here illustrated, said anode comprises a cylinder of porous carbon having a cavity 14 formed in the bottom thereof. A current collector 16 is provided in intimate contact with the upper portion of said anode 12 and is connected to the anode bus of the current supply, not shown. It will be noted that the upper end of the anode 12 extends above the electrolyte level 18. A circular cathode 20, which can be a screen formed of a suitable metal such as stainless steel, surrounds said anode 12 and is connected to the cathode bus of the current supply (not shown) by a suitable lead wire 22. Any suitable source of current and connections thereto can be employed in the practice of the invention. In the operation of the cell arrangement, a feedstock such as ethylene dichloride is introduced into the cavity portion of said anode 12 via conduit 15, travels upward through the pores of said anode, and exits from the upper end of said anode above electrolyte level 18. During passage through said anode, at least a portion of the feedstock is electrochemically fluorinated. Fluorinated products, together with any remaining unconverted feedstock, and possibly some electrolyte vapors, are withdrawn from the space above the electrolyte within cell body 11 via conduit 24. During the introduction of said feedstock an electric current in an amount sufficient to supply the desired operating current density at the anode is passed between the anode and the cathode.

The cell effluent stream in conduit 24 is passed into separation zone or means 26. Said separation means can comprise any suitable means such as fractional distillation, fractional crystallization, partial condensation or vaporization extraction, etc., including combinations thereof, for separating the cell products. Hydrogen can be withdrawn via conduit 28. Any hydrogen fluoride vapors which were withdrawn with the other cell products can be separated and returned to the electrolytic cell via conduit 30. As discussed above, and as shown in FIG. 2, when charging 1,2-dichloroethane as feedstock and employing a residence time of about 2.5 seconds, the only product produced in any significant concentration is 1,2-dichlorofluoroethane. When said 1,2-dichlorofluoroethane is the desired product, it can be withdrawn from separation zone 26 via conduit 32 and passed via conduit 34 to storage or other use as desired. The unreacted ethylene dichloride feedstock is withdrawn from separation zone 26 via conduit 36 and passed into conduit 15 for recycle to the electrolytic cell.

When, however, the desired final product is 1,2-dichlorotetrafluoroethane, said 1,2-dichlorofluoroethane in conduit 32 becomes a desired intermediate product which is then passed via conduit 38 into conduit 40 and into the pores of a porous carbon anode 12' disposed in a second electrolytic cell 10'. Said cell 10' and its associated elements are essentially like previously described cell 10 and the description of cell 10 applies to cell 10'. A cell effluent stream is withdrawn from cell 10' via conduit 42 and passed into separation zone or means 44. Said separation zone or means 44 can comprise any suitable means for making the desired separation of products. The desired product 1,2-dichlorotetrafluoroethane is withdrawn from separation zone 44 via conduit 46 to storage or other use as desired. The intermediate fluorinated products produced in cell 10', e.g., 1,2-dichloro-1,2-difluoroethane; 1,2-dichloro-1,1-difluoroethane; and 1,2-dichloro-1,2,2-trifluoroethane; and unreacted 1,2-dichlorofluoroethane, can be withdrawn from separation zone 44 via conduit 48 and recycled via conduit 50 and conduit 40 to electrolytic cell 10' for ultimate conversion to the desired product 1,2-dichlorotetrafluoroethane. If desired, the unreacted 1,2-dichlorofluoroethane can be separated from the di and trifluorinated intermediate reaction product stream, by further separation means (not shown), and recycled alone to said cell 10', with said intermediate reaction products being withdrawn via conduit 52. Hydrogen produced in cell 10' is withdrawn by conduit 54.

The residence or contact time in porous anode 12' is not critical because the residence or contact time in first porous anode 12 in cell 10 has been carefully regulated. Any suitable residence time can be employed in said anode 12'. It is only necessary that the residence time in anode 12' be insufficient to deplete all of the hydrogen in the feedstock compounds so as to avoid the production of elemental fluorine. Thus, any suitable resistance time which is insufficient to result in the production of elemental fluorine in the cell effluent stream can be employed in said anode 12'.

It will be noted, however, that the residence time or contact time employed in first anode 12 is carefully regulated or controlled so as to cause the course of the reaction and to produce substantially only desirable products therein. Thus, referring again to FIG. 2, the residence time in first anode 12 is preferably regulated or controlled so as to be not more than about 10 seconds, preferably not more than about 5 seconds, and more preferably not more than about 2.5 seconds. As discussed above, the maximum purity of the desired product, either 1,2-dichlorofluoroethane or 1,2-dichlorotetrafluoroethane, is obtained at a residence or contact time of not more than about 2.5 seconds.

The curves set forth in FIG. 2 were developed from data obtained in a series of runs carried out for the electrochemical fluorination of 1.2-dichloroethane. The electrolyte used in these runs had an approximate composition of KF·2HF. The essential elements of the apparatus employed are illustrated in the cells 10 and 10' shown in FIG. 3. This series of runs were carried out under substantially constant operating conditions except for the feed rate which was varied so as to vary the residence or contact time of the feedstock with the fluorinating species within the pores of the porous anode. Typical operating conditions were: volts, 8.25; cell temperature about 100° C.; current density, 250 milliamps per square centimeter of anode geometric surface; and conversions within the range of from about 5 to 98 per cent.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

We claim:

1. A process for the electrochemical fluorination of a flourinatable feedstock to a desired flourinated final product, which process comprises, in combination, the steps of:
    passing an electric current through a current-conducting, essentially anhydrous, liquid hydrogen fluoride electrolyte contained in an electrolysis cell provided with a cathode and a porous anode;
    passing said feedstock into the pores of said anode and therein fluorinating a portion of said feedstock to a desired fluorinated intermediate product at a regulated residence time which is sufficient for the formation of said intermediate product but which is insufficient for the formation of significant amounts of other fluorinated intermediate products and byproducts;
    passing an effluent stream comprising said desired intermediate product and unfluorinated feedstock from within said pores to a separation zone;
    in said separation zone, separating said desired intermediate product from said unfluorinated feedstock; and
    passing said thus-obtained separated desired intermediate product into the pores of a second porous anode in a second electrolysis cell and therein fluorinating same to said desired fluorinated final product.

2. A process according to claim 1 wherein: said porous anode comprises porous carbon; said feedstock is 1,2-dichloroethane; said desired fluorinated intermediate product is 1,2-dichlorofluoroethane; and said desired fluorinated final product is 1,2-dichlorotetrafluoroethane.

3. A process according to claim 1 wherein said residence time in said first-mentioned anode is not more than about 2.5 seconds.

4. A process according to claim 1 wherein said residence time in said first-mentioned anode is not more than about 5 seconds.

5. A process according to claim 1 wherein said residence time in said first-mentioned anode is not more than about 10 seconds.

6. A process according to claim 1 wherein said unfluorinated feedstock is recycled from said separation zone into the pores of said porous anode.

7. A process according to claim 6 wherein: said porous anode comprises porous carbon; said feedstock is 1,2-dichloroethane; said fluorinated product is 1,2-dichlorofluoroethane; and said residence time is not more than about 2.5 seconds.

8. A process according to claim 1 wherein: a second effluent stream comprising said desired fluorinated final product, unreacted desired fluorinated intermediate product, and other intermediate fluorinated products is passed from within the pores of said second anode to a second separation zone; said desired fluorinated final product is recovered from said second separation zone; and another stream comprising said unreacted desired fluorinated intermediate product and said other intermediate fluorinated products is recycled from said second separation zone into the pores of said second porous anode.

9. A process according to claim 8 wherein: said porous anode comprises porous carbon; said feedstock is 1,2-dichloroethane; said desired fluorinated intermediate product is 1,2-dichlorofluoroethane; said desired fluorinated final product is 1,2-dichlorotetrafluoroethane; said other intermediate fluorinated products comprise 1,2-dichloro-1,2difluoroethane, 1,2-dichloro-1,1-difluoroethane, and 1,2-dichloro-1,2,2-trifluoroethane; and said residence time in said first-mentioned anode is not more than about 2.5 seconds.

* * * * *